(12) United States Patent
Ozeki et al.

(10) Patent No.: US 7,013,128 B2
(45) Date of Patent: Mar. 14, 2006

(54) TERMINAL DEVICE AND TERMINAL DEVICE OPERATION MANAGEMENT SYSTEM AND OPERATION MANAGEMENT METHOD

(75) Inventors: Satoshi Ozeki, Nagoya (JP); Kazumi Sawayanagi, Itami (JP); Kana Yamauchi, Toyohashi (JP); Mie Nakamura, Toyokawa (JP); Masahito Takano, Toyokawa (JP); Yoshihiko Yoshizaki, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 338 days.

(21) Appl. No.: 10/265,166

(22) Filed: Oct. 7, 2002

(65) Prior Publication Data
US 2003/0073448 A1 Apr. 17, 2003

(30) Foreign Application Priority Data
Oct. 17, 2001 (JP) ............................. 2001-319736

(51) Int. Cl.
*H04M 5/16* (2006.01)

(52) U.S. Cl. .................. 455/411; 455/418; 455/456.1; 380/247; 380/248

(58) Field of Classification Search ............ 455/456.6, 455/456.5, 456.1, 457, 411, 410, 414.1, 435, 455/418; 342/357.01, 357.06, 357.09; 380/247, 380/248
See application file for complete search history.

(56) References Cited

U.S. PATENT DOCUMENTS

| | | | |
|---|---|---|---|
| 6,360,102 B1 * | 3/2002 | Havinis et al. | 455/457 |
| 6,411,807 B1 * | 6/2002 | Amin et al. | 455/432.3 |
| 6,567,661 B1 * | 5/2003 | McDonnell et al. | 340/870.07 |
| 2002/0009995 A1 * | 1/2002 | Fujii | 455/435 |
| 2002/0055361 A1 * | 5/2002 | McDonnell et al. | 455/456 |
| 2002/0111172 A1 * | 8/2002 | DeWolf et al. | 455/456 |

FOREIGN PATENT DOCUMENTS

| | | |
|---|---|---|
| JP | 07-311715 | 11/1995 |
| JP | 09-167041 | 6/1997 |
| JP | 11-110209 | 4/1999 |
| JP | 11-184548 | 7/1999 |
| JP | 2000-341749 | 12/2000 |

* cited by examiner

*Primary Examiner*—Danh Cong Le
(74) *Attorney, Agent, or Firm*—Morrison & Foerster LLP

(57) ABSTRACT

A portable terminal includes a function to detect its own location. The owner of such terminal registers in advance an area in which he expects to be for a given time slot as conditions for operation. The portable terminal verifies its location with respect to the operation conditions set by the owner, and where it is determined that the operation conditions are not met, the portable terminal disables itself, prohibiting its use. Where a pre-registered password is subsequently input, the portable terminal cancels this prohibition. Consequently, if the owner loses the portable terminal while away from home or the office, for example, a third party cannot operate the portable terminal, and moreover, unless the owner-registered password is input, the prohibition is not cancelled, thereby preventing disclosure of the data and other information stored in the portable terminal.

11 Claims, 7 Drawing Sheets

TERMINAL DEVICE AND TERMINAL DEVICE OPERATION MANAGEMENT SYSTEM AND OPERATION MANAGEMENT METHOD

The present application claims priority to Japanese Patent Application No. 2001-319736 filed Oct. 17, 2001, the entire content of which is hereby incorporated by reference.

BACKGROUND OF THE INVENTION

1. Field of the Invention

The present invention relates to a mobile terminal device such as a cellular phone, a personal computer or an image forming apparatus, as well as to a method to manage the operation of such terminal device.

2. Description of the Related Art

Terminal devices such as cellular phones and personal computers known in the conventional art are equipped with a security function by which to prevent third parties from using such devices without the owner's permission.

For example, Japanese Laid-Open Patent Applications H11-184548, H9-167041 and H7-311715 disclose constructions that prohibit input or disable subsequent input when no operations or inputs are received for a certain period of time, and that cancel such input lock or disabled state when an appropriate password is input.

In addition, Japanese Laid-Open Patent Application H11-110209 discloses a construction that includes an expiration for the password such that unless the password is periodically re-registered, the terminal device cannot be used on a continuous basis.

Incidentally, a terminal device such as a cellular phone is often used by the owner during a business trip or while commuting, as well as at the regular place of use such as the office, for example, and when the terminal device is used during these occasions, the terminal device may be left on the train by the owner or stolen.

However, because the conventional technologies referred to above take into consideration only the security applicable at the regular place of use, they cannot effectively deal with issues that arise when the terminal device becomes separated from the owner against his will. For example, if a third party who finds the terminal device operates it without the owner's permission, confidential information and other personal information stored in the memory of the terminal device may be revealed via such operation.

SUMMARY OF THE INVENTION

A main object of the present invention is to provide a terminal device that can prevent the abuse thereof by a third party when it has become separated from the owner against his will, as well as a method to manage the operation of such terminal device.

In order to attain these and other objects, according to one aspect of the present invention, the terminal device includes location detecting means that detects the location of the terminal device; determining means that determines whether or not the location detected by the location detecting means meets prescribed conditions; prohibiting means that prohibits the operation of the terminal device when the determining means determines that the prescribed conditions are not met; input means by which to input authentication information; and canceling means that cancels the prohibition imposed by the prohibiting means when the pre-registered authentication information is input via the input means while the operation of the terminal device is prohibited by the prohibiting means.

Because the operation of this terminal device is prohibited when it is determined that the location thereof does not meet prescribed conditions, a third party is prevented from operating the terminal device even if it is lost or stolen, for example, so long as the location of the terminal device does not meet the prescribed conditions, and because the prohibition is not cancelled until the prescribed authentication information is input, disclosure of the data and other information stored in the terminal device is reliably prevented.

According to another aspect of the present invention, the determining means includes transmitting means that transmits to an external device location information that indicates the location detected by the location detecting means; and receiving means that receives from the external device a return signal that indicates the result of comparison of the location information with the prescribed conditions.

It is preferred that the prescribed conditions include conditions regarding the area covered by each base station as well as conditions regarding the activity schedule of the owner of the terminal device.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

An embodiment of the present invention is described below with reference to the drawings.

Figure 1:
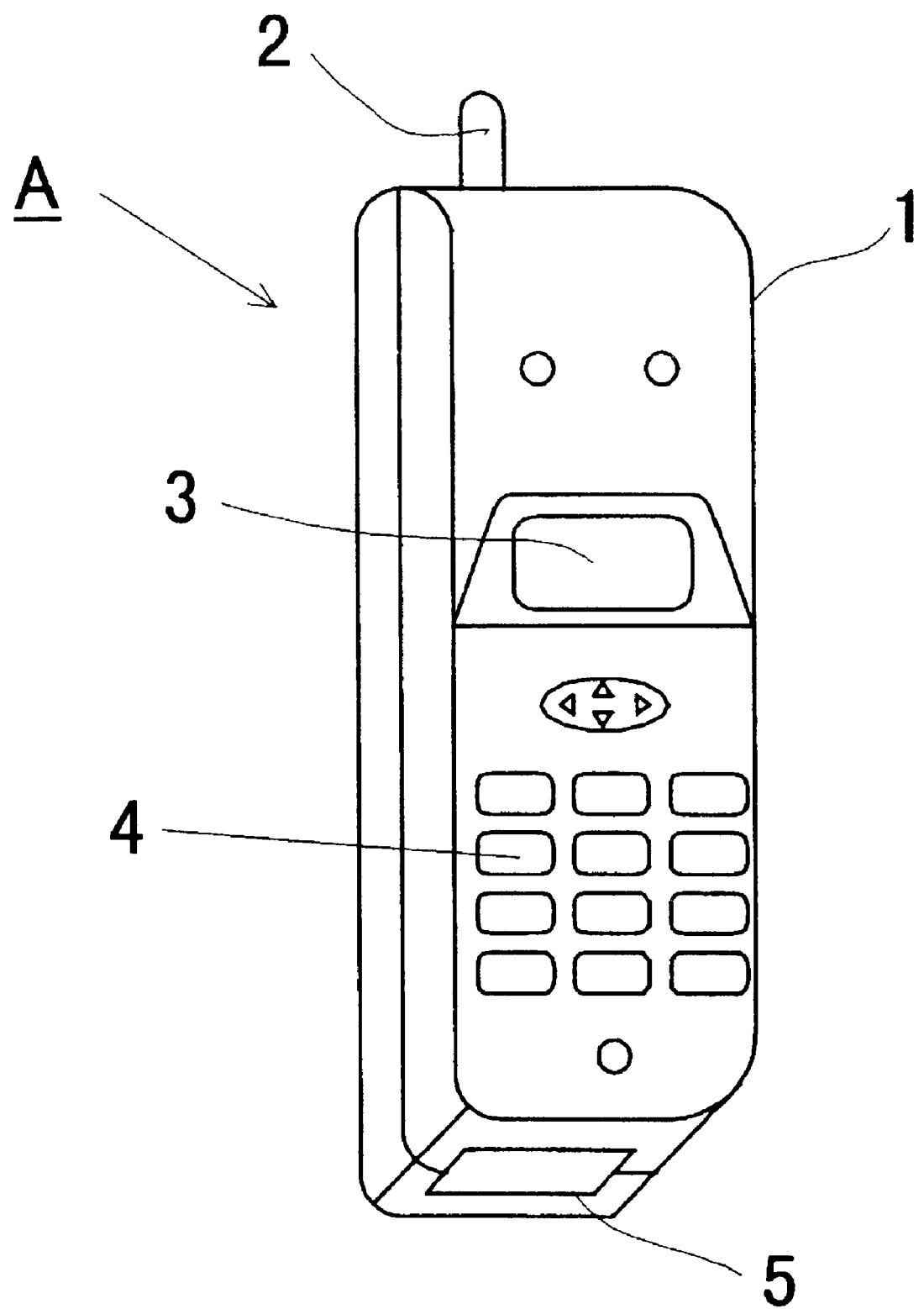
FIG. 1 is an external perspective view of a cellular phone in which the terminal device pertaining to one embodiment of the present invention is applied.

FIG. 1 is an external perspective view of a cellular phone in which the terminal device pertaining to one embodiment of the present invention is applied. In this embodiment, a system that manages the operation of the cellular phone resides in the cellular phone.

With reference to FIG. 1, 1 is the main unit of the terminal device, which is equipped with means to detect the location of the terminal device as described below.

An antenna 2 is located on the top surface of the main unit 1, and a display panel 3, operation keys 4, etc. are located on the front surface thereof. An external interface 5 is located on the bottom surface of the main unit 1.

The antenna 2 transmits radio waves to a relay base station R1 (FIG. 2) that covers the current location while the terminal device is being used for communication such as a telephone conversation, and receives radio waves such as telephone signals from the relay base station R1.

The display panel 3 comprises an LCD screen or an EL element, for example, and displays a screen by which to set operation conditions as those described below, a screen by which to communicate with an external device, a screen by which to specify a password comprising authentication information, a screen by which to input the password, etc.

The operation keys 4 are used to perform various types of operations as well as to set operation conditions, specify a password and input the password.

The external interface 5 is used when communication is to be performed using an external device such as a personal computer (not shown), in order to connect the terminal device to such external device.

Figure 2:
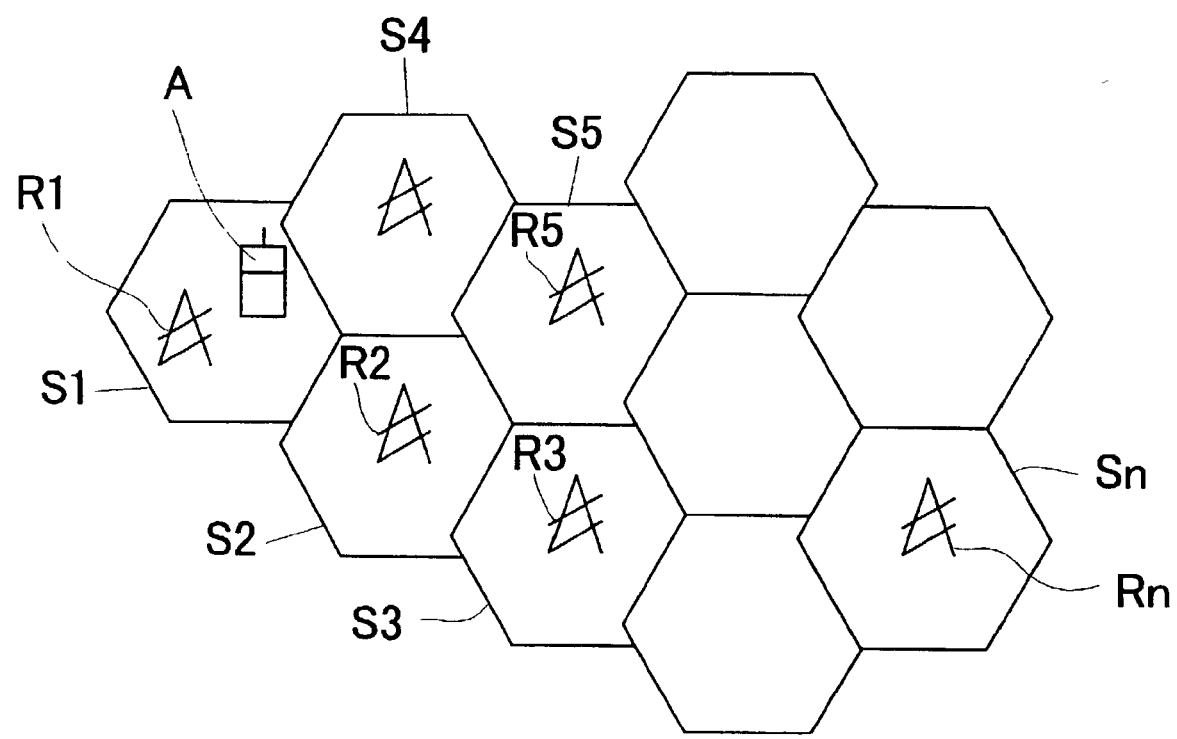
FIG. 2 is a drawing to explain the movement of the cellular phone.

FIG. 2 is a drawing to explain the movement of the cellular phone A.

The cellular phone A can carry out communication in certain ranges (areas) S1, S2, . . . Sn corresponding to relay base stations R1, R2, . . . Rn. Where the cellular phone A has moved from the area corresponding to a particular relay base station, such as from the area S1 in which the cellular phone A can communicate with the relay base station R1 to an adjacent area S2, the relay base station with which the cellular phone A can communicate changes to the relay base station R2 that corresponds to the area S2 to which it has moved.

The detection as to the area in which the cellular phone A currently resides, i.e., the detection as to the location of the cellular phone A, can be made by measuring the intensity of the electric field or the like of the radio waves received by each base station, for example. Where the cellular phone A has moved from the area S1 corresponding to the relay base station R1 to an adjacent area S2, such movement is detected as well. Detection of the location is carried out at certain intervals in this embodiment.

Figure 3:
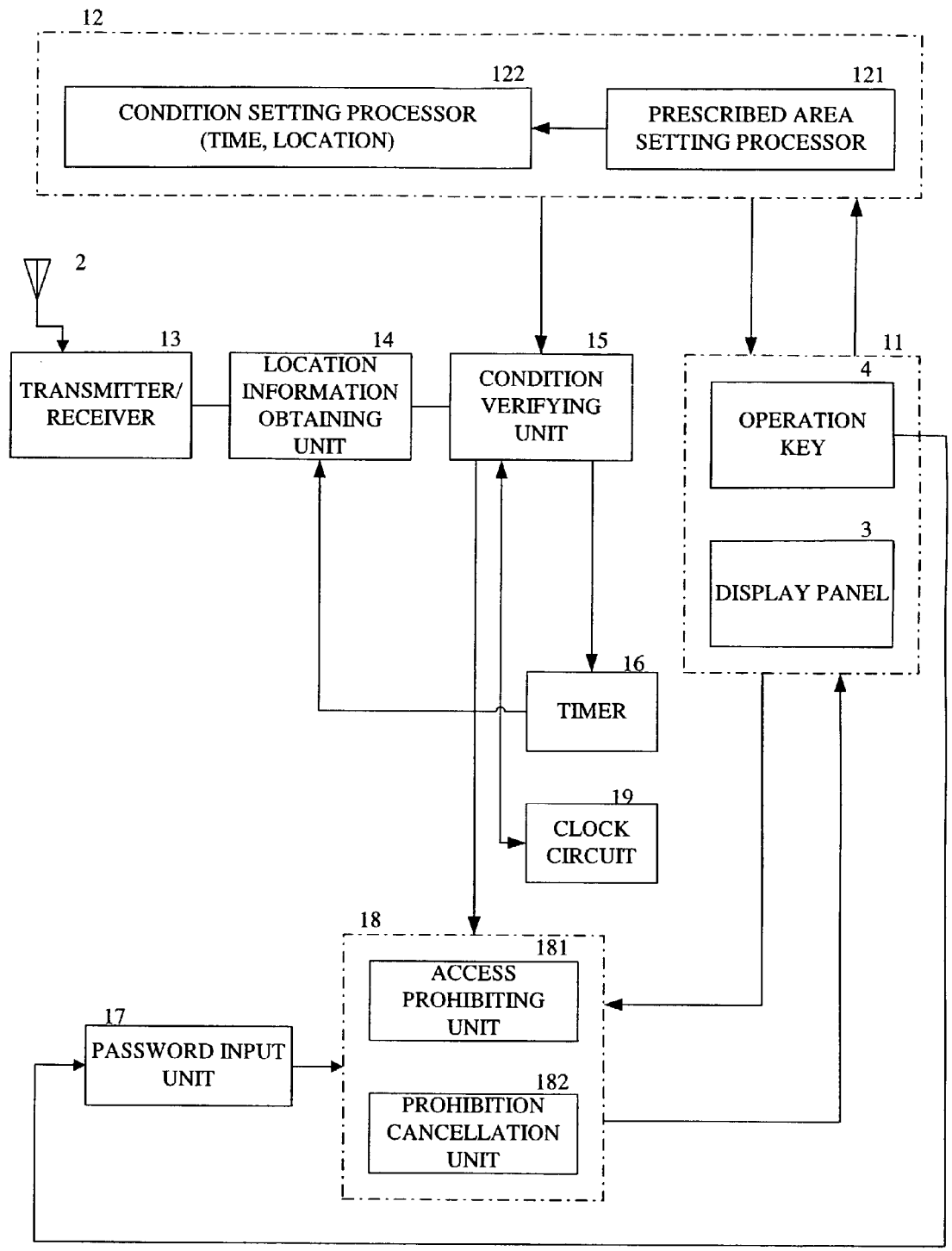
FIG. 3 is a block diagram showing the functional construction of the cellular phone.

FIG. 3 is a block diagram showing the functional construction of the cellular phone A.

With reference to FIG. 3, the cellular phone A includes a display/input unit 11, an operation condition setting unit 12, a transmitter/receiver 13 that transmits and receives radio waves to and from the relay base stations R1, R2, . . . Rn, a location information obtaining unit 14, a condition verifying unit 15, a timer 16, an authentication information (password) input unit 17, an operation controller 18, and a clock circuit 19.

The display/input unit 11 includes the display panel 3, the operation keys 4, etc. By operating the operation keys 4, the areas in which the cellular phone A is permitted to operate can be set and input, and furthermore, such information as the planned activity areas (locations) and times (time slots), which constitute the owner's activity schedule information, can also be input.

The operation condition setting unit 12 comprises a prescribed area setting processor 121 and a condition setting processor 122.

Based on input via the operation keys 4, the prescribed area setting processor 121 sets the areas S1 and S3, for example, as the areas in which the operation of the cellular phone A is permitted. The condition setting processor 122 sets, based on input via the operation keys 4, the owner's activity schedule in conjunction with the prescribed area setting processor 121. In other words, among the specified areas S1 and S3, it specifies the time slots of 9:00 a.m. to 10:00 a.m. for the area S1, and 3:00 p.m. to 5:00 p.m. for the area S3, for example, based on input via the operation keys 4.

The activity schedule information may comprise information regarding either planned activity areas or time slots. In addition, the input to the operation condition setting unit 12 is not limited to that made using the operation keys 4. A method in which information is downloaded from the Internet may be used. Furthermore, the setting of the activity schedule may be made by having such setting linked with the scheduling function of the cellular phone A.

The transmitter/receiver 13 performs communication with relay base stations via the antenna 2.

The location information obtaining unit 14 detects from the intensity of the radio waves received via the antenna 2 the relay base station area in which the cellular phone A is currently located. Incidentally, it is possible to further divide each area into smaller sections.

In addition, location detection can be achieved not only based on the intensity of the radio waves received by the antenna 2, but also by a GPS-based method if appropriate.

The condition verifying unit 15 checks the current location of the cellular phone A against preset operation conditions and determines whether or not the location meets the conditions. Any method can be used for such verification (determination).

The timer 16 is used in order to obtain the location information and conduct location verification on a periodic basis. The intervals set using the timer 16 can be freely changed by the owner. It is also acceptable if the intervals for the obtaining of location information or location verification are not set using the timer 16, and instead, the time at which the cellular phone A has moved out of an area S1, S2, S3 . . . Sn is determined and location verification is performed at such time.

The password input unit 17 is used by the owner to input the pre-registered authentication information. The authentication information is input using the operation keys 4.

The operation controller 18 is equipped with an access prohibiting unit 181 and a prohibition cancellation unit 182. The clock circuit 19 has a calendar function, and can track the current date and time.

The access prohibiting unit 181 prohibits access to the memory when the condition verifying unit 15 determines that the current location information does not meet the conditions for operation, and the prohibition cancellation unit 182 cancels the prohibition when the password pre-registered by the owner is input.

In other words, suppose that in the construction described above, the owner of the cellular phone A, based on his schedule, sets as the conditions for operation the area S1, which comprises planned activity data, in conjunction with the time slot 9:00 a.m. to 10:00 a.m. during which he will be in the area S1, and the area S3 in conjunction with the time slot 3:00 p.m. to 5:00 p.m. during which he will be in the area S3.

If the owner leaves home or the office with the cellular phone A, the current location of the cellular phone A is obtained and verification and determination by the condition verifying unit 15 are performed at certain intervals prompted by the timer 16. While the cellular phone A is in the area S1 during the 9:00 a.m.–10:00 a.m. time slot and is in the area S3 during the 3:00 p.m.–5:00 p.m. time slot, the condition verifying unit 15 determines that the set conditions for operation are met by the location of the cellular phone A, and therefore the operation of the cellular phone A is not prohibited and the cellular phone A can be used normally.

However, if the owner leaves the cellular phone A on the train while travelling and a third party finds it, leaves the area S1 during the scheduled 9:00 a.m.–10:00 a.m. time slot and moves to the area S2, for example, the condition verifying unit 15 determines that the location of the cellular phone A does not meet the set conditions for operation.

The cellular phone A that receives this determination result prohibits via the memory access prohibiting unit 181 access to the memory of the cellular phone A. Consequently, where the third party operates the cellular phone A with the intention of improperly using it, he cannot access the memory, thereby preventing disclosure in the data in the memory. The prohibition of access to the memory is cancelled only when the authentication information pre-registered by the owner is input.

In this embodiment, because the cellular phone An itself carries out the verification operation described above, a server or similar external device is not required for the verification, resulting in a smaller capital investment expenditure.

The sequence of the operation management processes performed by the cellular phone A will now be described with reference to the flow chart of FIG. 4.

Figure 4:
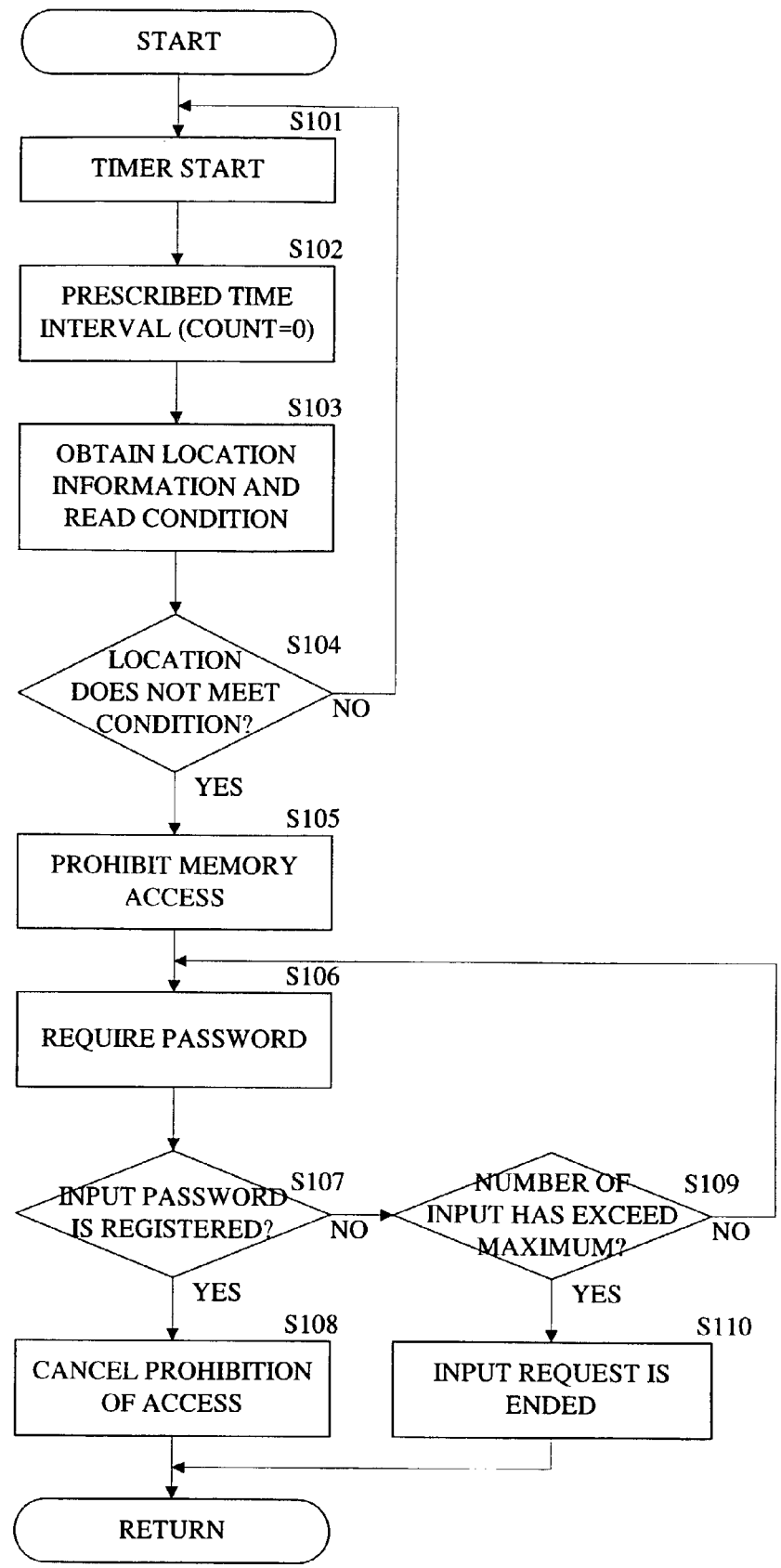
FIG. 4 is a flow chart showing the sequence of the operation management processes regarding the cellular phone.

With reference to FIG. 4, counting by the timer 16 is begun in S101 in order to obtain the current location of the cellular phone A and to perform the verification operation at certain intervals.

When the passage of a prescribed time interval is detected by the timer 16 in S102, the location information obtaining unit 14 obtains the location information in S103, and at the same time, the condition verifying unit 15 reads the conditions for operation set by the operation conditions setting unit 12 (operation keys 4, etc.).

It is then determined in S104 whether or not the information regarding the current location of the cellular phone A meets the conditions for operation (location and time). Where the location information does not meet the conditions for operation (determination in S104 results in YES), input from an external source to the cellular phone A is prohibited. More specifically, access to the memory is prohibited. Where the location information meets the conditions for operation (determination in S104 results in NO), the cellular phone A returns to S101 without any further processing, whereby the state in which operation of the cellular phone A is enabled is maintained.

Accordingly, where the owner is moving according to schedule while carrying the cellular phone A, the cellular phone A can be used normally, but if the cellular phone A is lost while it should be in the specified area S1 or is stolen by a third party and moved outside the specified area, access to the memory is prohibited. Therefore, even if the third party operates the cellular phone A, he cannot access the memory and disclosure of the data therein is prevented.

After access to the memory is prohibited, input of the registered password is requested in S106, whereby an input request screen is displayed on the display panel 3.

It is determined in S107 whether or not the input password is the registered password. If it is the registered password (determination in S107 results in YES), the prohibition of access to the memory is cancelled in S108 and the entire routine comes to an end.

Because the prohibition is cancelled when the registered password is input, as described above, even if the owner has to move to an unscheduled area, he can use the cellular phone A without any problems.

If the input password is not the registered password (determination in S107 results in NO), because erroneous input by the owner is a possibility, it is determined in S109 whether or not the number of password input operations performed has exceeded the allowed maximum in order to determine whether or not to request another password input operation. Where the number of password input operations has not exceeded the allowed maximum (determination in S109 results in NO), the cellular phone A returns to S106 and requests input of the registered password once more. Where the number of password input operations has exceeded the allowed maximum (determination in S109 results in YES), it is deemed that the many password input operations are not the result of the owner's erroneous input operations but the result of input by a third party, and the password input request is ended in S110, whereupon the entire routine is ended.

Consequently, the risk that a third party will input the password and use the cellular phone A to which access to the memory has been prohibited is eliminated.

Another embodiment of the present invention will now be described below with reference to the drawings.

Figure 5:
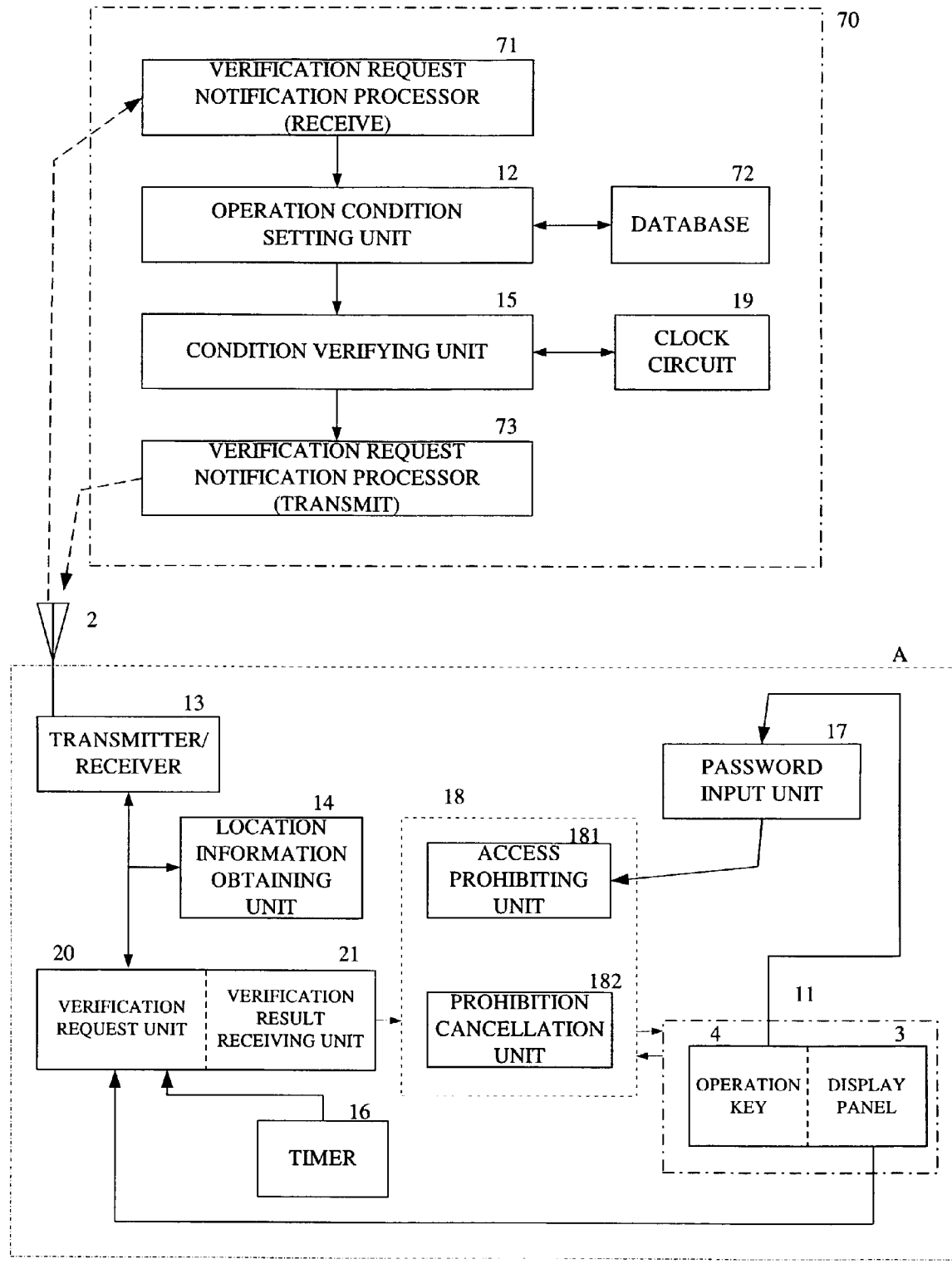
FIG. 5 is a block diagram showing the functional construction of the operation management system for a cellular phone pertaining to another embodiment of the present invention.

FIG. 5 is a block diagram showing the functional construction of the operation management system of a cellular phone A in which the terminal device pertaining to another embodiment of the present invention is applied. The same numbers are used for the identical or equivalent components as those shown in FIG. 3, and description thereof is omitted.

With reference to FIG. 5, this management system includes a server 70 as an external device that can conduct wireless communication with the cellular phone A. The method of communication between the cellular phone A and the server 70 is not limited to the wireless method. Any communication method can be used, including wired communication or satellite communication.

The cellular phone A includes a verification request unit 20 and a verification result receiving unit 21, as well as the display/input unit 11, the transmitter/receiver 13, the location information obtaining unit 14, the timer 16, the authentication information (password) input unit 17, and the operation controller 18.

The verification request unit 20 requests that the server 70 conduct verification and determination as to whether or not the current location meets the operation conditions. The verification request is made at certain intervals prompted by the timer 16 in the same manner as in the embodiment shown in FIGS. 1 through 4.

The verification result receiving unit 21 receives a return signal indicating the verification result from the server 70 and forwards it to the operation controller 18.

On the other hand, the server 70 includes a verification request notification processor 71, an operation condition setting unit 12, a database 72, a clock circuit 19, a condition verifying unit 15, and a verification result notification processor 73.

The verification request notification processor 71 receives a verification request signal from the cellular phone A and causes the condition verifying unit 15 to perform verification.

The owner's schedule information and the specified area information are stored in the database 72.

The operation condition setting unit 12 sets operation conditions based on the information stored in the database 72, while taking the owner's schedule into consideration.

For example, it specifies the 9:00 a.m.–10:00 a.m. time slot for the area S1 and the 3:00 p.m.–5:00 p.m. time slot for the area S3.

The condition verifying unit 15 determines whether or not the location of the cellular phone A meets the operation conditions set by the operation condition setting unit 12 based on the location information obtained by the location information obtaining unit 14 and the time information obtained from the clock circuit 19. The verification result notification processor 73 sends the result of the verification to the cellular phone A as a return signal.

The sequence of the processes to prohibit access to the memory in the operation management system having the construction shown in FIG. 5 will now be described with reference to the flow chart of FIG. 6.

<Where Verification is Automatically Requested from Server>

Figure 6:
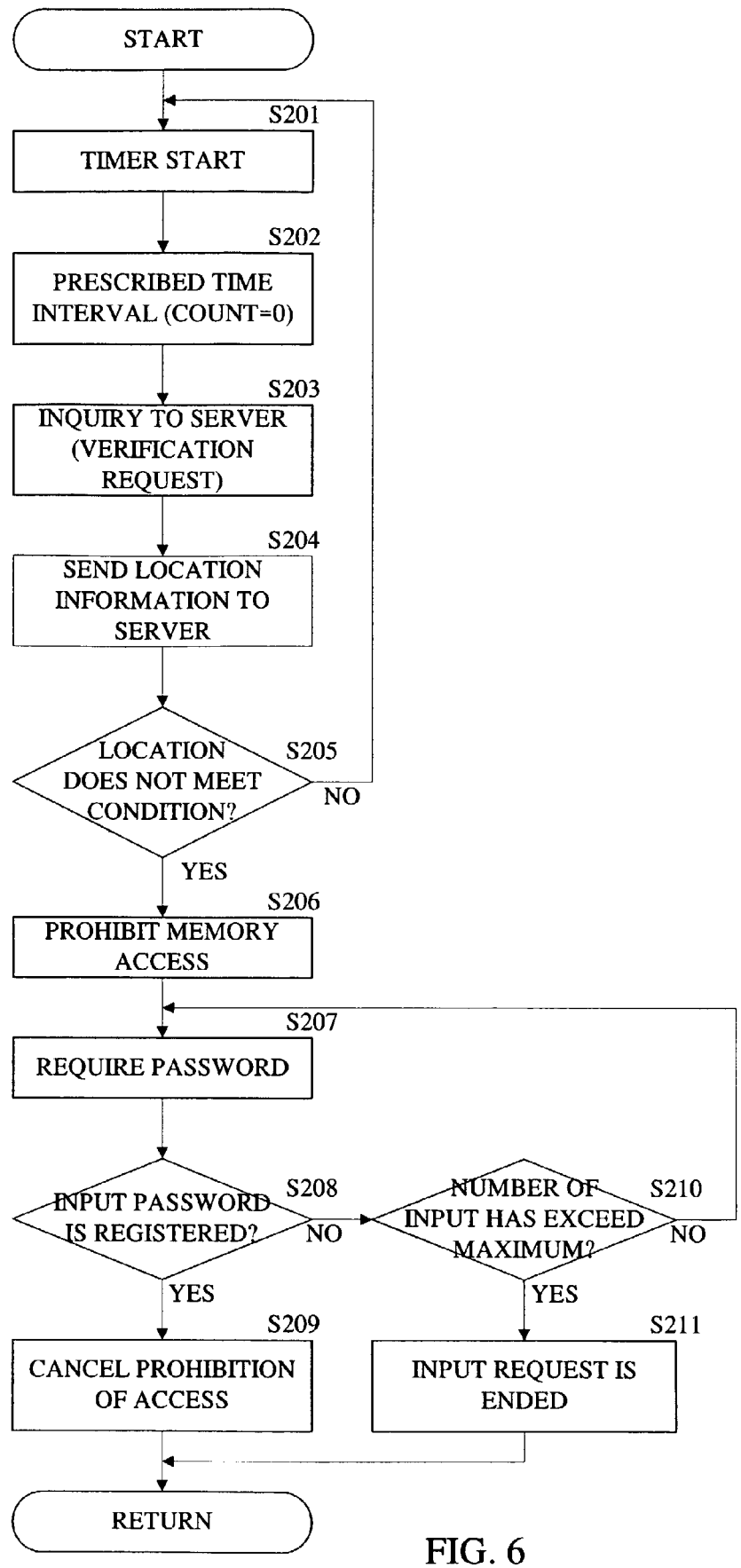
FIG. 6 is a flow chart showing the sequence of the operation management processes regarding the cellular phone.

With reference to FIG. 6, counting by the timer 16 is begun in S201 in order to make a verification request at prescribed intervals.

When the timer 16 thereafter detects that a certain period of time has elapsed in S202, the verification request unit 20 sends a verification request signal to the server 70 via the transmitter/receiver 13 and the antenna 2 in S203.

On the side of the server 70, the verification request notification processor 71 is activated upon the receipt of this request signal.

The location of the cellular phone A is then detected by the location information obtaining unit 14 in S204, and location information indicating this location is sent to the server 70 via the transmitter/receiver 13 and the antenna 2.

On the side of the server 70, the condition verifying unit 15 determines, based on the received location information for the cellular phone A, the time information from the clock circuit 19 and the operation conditions set by the operation condition setting unit 12, whether or not the current location of the cellular phone A does not satisfy the operation conditions. The result of the verification (including whether or not password input is required) is sent by the verification result notification processor 73 to the cellular phone A as a return signal.

In the cellular phone A, the verification result receiving unit 21 receives the return signal via the transmitter/receiver 13, and determines in S205 based on the return signal whether or not the current location does not satisfy the operation conditions. Where the current location does not satisfy the operation conditions (determination in S205 results in YES), the operation controller 18 prohibits input from an external source to the cellular phone A in S206. More specifically, it prohibits access to the memory. Where the current location does not fall outside the operation conditions (determination in S205 results in NO), operation of the cellular phone A is kept enabled and the cellular phone A returns to S201.

Because of this memory access prohibition, if the cellular phone A is lost or stolen and moved outside the prescribed areas and operated by a third party, data disclosure is prevented.

After access to the memory is prohibited, input of the registered password is requested in S207, whereupon an input request screen is displayed on the display panel 3.

It is determined in S208 whether or not the input password is the registered password. If the input password is the registered password (determination in S208 results in YES), the memory access prohibition is cancelled in S209 and the entire routine comes to an end.

Because the prohibition is cancelled when the registered password is input, as described above, even if the owner has to move to an unscheduled area, he can use the cellular phone A without any problems.

If the input password is not the registered password (determination in S208 results in NO), because erroneous input by the owner is a possibility, it is determined in S210 whether or not the number of password input operations performed exceeded the allowed maximum in order to determine whether or not to request another password input operation. Where the number of password input operations did not exceed the allowed maximum (determination in S210 results in NO), the cellular phone A returns to S207 and requests input of the registered password once more. Where the number of password input operations exceeded the allowed maximum (determination in S210 results in YES), it is deemed that the many password input operations are not the result of the owner's erroneous input operations but the result of input by a third party, and the password input request is ended in S211, whereupon the entire routine is ended.

Consequently, the risk that a third party will input the password and use the cellular phone A to which access to the memory has been prohibited is eliminated.

Furthermore, in this embodiment, because the determination as to whether or not the location of the cellular phone A meets the operation conditions is made on the side of the server 70, the cellular phone A is freed from the burden of performing verification.

<Where Verification is Requested from Server 70 in Response to Operation of Cellular Phone A>

Figure 7:
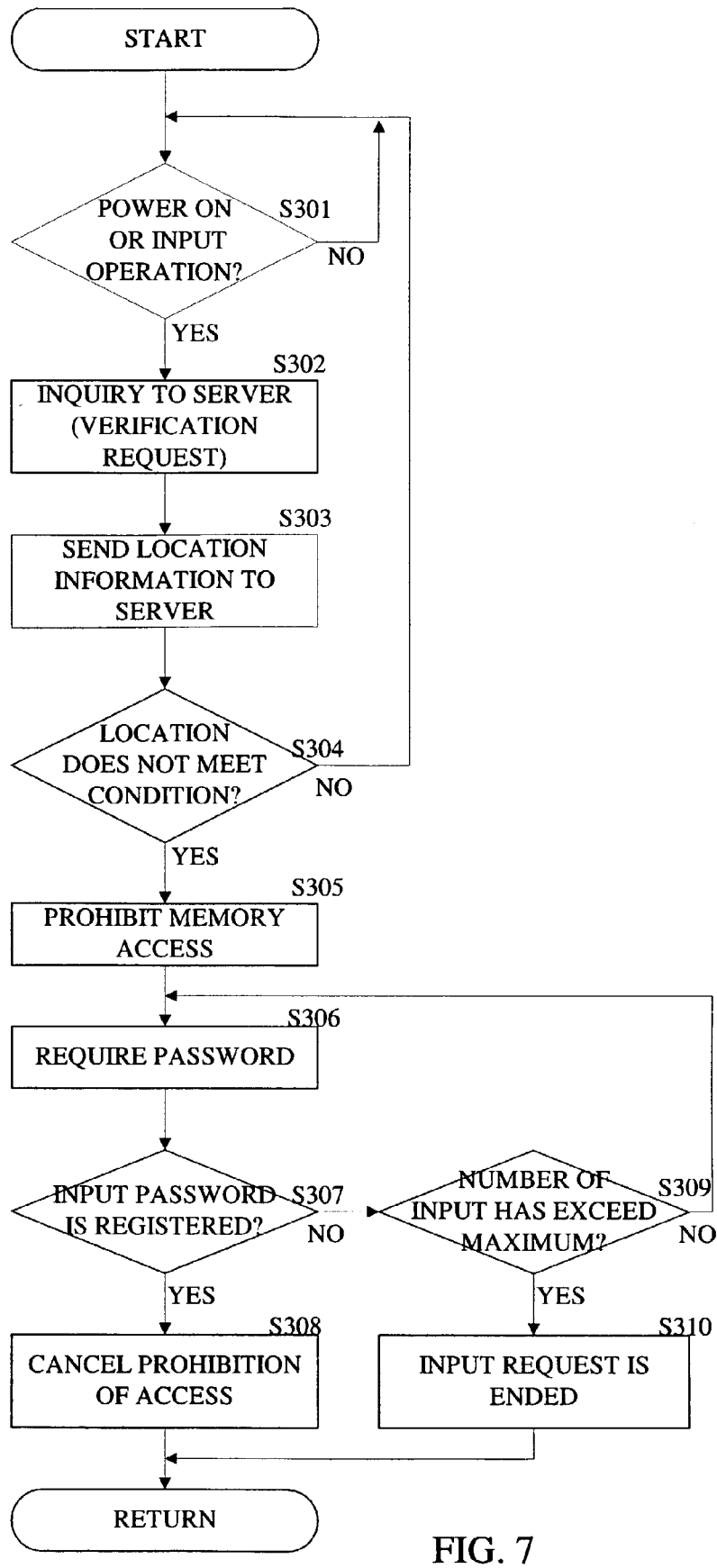
FIG. 7 is a flow chart showing another sequence of the operation management processes regarding the cellular phone.

Referring to FIG. 7, it is determined in S301 whether or not any input was made by the owner of the cellular phone A, i.e., whether power was turned ON or any input operations using the operation keys 4 were conducted, for example.

Where input was made by the owner (determination in S301 results in YES), the verification request unit 20 sends a verification request signal to the server 70 via the transmitter/receiver 13 and the antenna 2 in S302. On the side of the server 70, the verification request notification processor 71 is activated in response to this request signal. Where there was no input by the owner (determination in S301 results in NO), the verification request unit 20 stands by until an input operation is made. The password input operation described below is not deemed an input operation in S301.

The location information obtaining unit 14 obtains location information in S303, and sends it to the server 70 via the transmitter/receiver 13 and the antenna 2.

On the side of the server 70, the condition verifying unit 15 determines, based on the received location information for the cellular phone A, the time information from the clock circuit 19 and the operation conditions set by the operation condition setting unit 12, whether or not the current location of the cellular phone A does not satisfy the operation conditions, and the verification result notification processor 73 sends the result of the verification (including whether or not password input is required) to the cellular phone A as a return signal.

On the side of the cellular phone A, the verification result receiving unit 21 receives the return signal via the transmitter/receiver 13, and determines based on the return signal whether or not the current location does not satisfy the operation conditions in S304. Where the current location does not satisfy the operation conditions (determination in S304 results in YES), the operation controller 18 prohibits input from an external source to the cellular phone A in S305. More specifically, it prohibits access to the memory. Where the current location satisfies the operation conditions (determination in S304 results in NO), operation of the cellular phone A is kept enabled and the cellular phone A returns to S301.

Because of this memory access prohibition, if the cellular phone A is lost or stolen and moved outside the prescribed areas and operated by a third party, disclosure of data is prevented.

After access to the memory is prohibited, input of the registered password is requested in S306, whereupon an input request screen is displayed on the display panel 3.

It is determined in S307 whether or not the input password is the registered password. If the input password is the registered password (determination in S307 results in YES), the memory access prohibition is cancelled in S308 and the entire routine comes to an end.

Because the prohibition is cancelled when the registered password is input, as described above, even if the owner has to move to an unscheduled area, he can use the cellular phone A without any problems.

If the input password is not the registered password (determination in S307 results in NO), because erroneous input by the owner is a possibility, it is determined in S309 whether or not the number of password input operations performed exceeded the allowed maximum in order to determine whether or not to request another password input operation. Where the number of password input operations did not exceed the allowed maximum (determination in S309 results in NO), the cellular phone A returns to S306 and requests input of the registered password once more. Where the number of password input operations exceeded the allowed maximum (determination in S309 results in YES), the many password input operations are deemed to be not the result of the owner's erroneous input operations but the result of input by a third party, and the password input request is ended in S310, whereupon the entire routine is ended.

Consequently, the risk that a third party will input the password and use the cellular phone A to which access to the memory has been prohibited is eliminated.

In the embodiment described above, the determination regarding whether or not the current location falls within the prescribed area is made while taking into consideration the schedule information for the owner of the cellular phone A, but it is also acceptable if the schedule information is not taken into consideration.

Where a server 70 is used, it does not matter whether the constituent elements are included in the cellular phone A or the server 70 as long as no problems arise in the system as a whole. For example, the server 70 may be equipped with a function to issue to the access prohibiting unit 181 an instruction to prohibit access to the memory.

In addition, each of the above embodiments was described using a cellular phone A as an example of the terminal device, but the terminal device is not limited to a cellular phone, and may comprise a portable personal computer or a mobile image forming apparatus such as a copying machine, a facsimile or a printer. In the case of a portable personal computer, files created using application software are stored in the memory, and most of these files are confidential. Therefore, control is needed to prevent the reading of at least the files stored in the memory if the operation conditions are not met through verification. For example, operations performed in order to input the authentication information should be allowed, while other types of operations should be prohibited. In the case of a copying machine, facsimile or printer, because there is a slim chance that data may remain in the memory, where the operation conditions are not met through verification, image forming operations such as printing operations should be prohibited.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A terminal device, comprising:
   a location detecting unit for detecting a location of the terminal device;
   a determining unit for determining whether or not the location detected by said location detecting unit meets prescribed conditions;
   a prohibiting unit for prohibiting operation of the terminal device when said determining unit determines that the prescribed conditions are not met;
   an input unit for inputting authentication information; and
   a canceling unit for canceling the prohibition imposed by said prohibiting unit when the authentication information input via said input unit, while the operation of the terminal device is prohibited by said prohibiting unit, matches pre-registered authentication information;
   wherein the prescribed conditions comprise a time component and an associated area component.

2. A terminal device according to claim 1, wherein said determining unit includes:
   a transmitting unit for transmitting to an external device location information that indicates the location detected by said location detecting unit; and
   a receiving unit for receiving from the external device a return signal that indicates a result of a comparison of the location information with the prescribed conditions.

3. A terminal device according to claim 1, wherein the area component comprises information regarding an area covered by each of a plurality of base stations.

4. A terminal device according to claim 1, wherein said prohibiting unit prohibits the operation of the terminal device when said determining unit determines that the current location and time associated with the terminal device are not included in the prescribed conditions.

5. A terminal device according to claim 1, wherein the prescribed conditions include conditions regarding the activity schedule of the owner of the terminal device.

6. A terminal device according to claim 5, wherein the activity schedule of the owner comprises time slots, and the prescribed conditions include conditions regarding areas which are set for each of the time slots.

7. A terminal device according to claim 6, further comprising
   a timer for obtaining a current time,
   wherein said prohibiting unit prohibits the operation of the terminal device when said determining unit determines that the terminal device is located outside the area corresponding to the time obtained by said timer.

8. A terminal device according to claim 1, further comprising
   a memory for storing information,
   wherein said prohibiting unit prohibits the access to said memory when said determining unit determines that the prescribed conditions are not met.

9. A terminal device according to claim 1, wherein said prohibiting unit prohibits operations other than the operation for inputting the authentication information when said determining unit determines that the prescribed conditions are not met.

10. A method for managing an operation of a terminal device, comprising the steps of:
   detecting the location of the terminal device;
   determining whether or not the detected location meets prescribed conditions;
   prohibiting the operation of the terminal device when it is determined that the prescribed conditions are not met;
   inputting authentication information; and
   canceling the prohibition of the operation of the terminal device when the input authentication information matches pre-registered authentication information;
   wherein the prescribed conditions comprise a time component and an associated area component.

11. A method for managing an operation of a terminal device, comprising the steps of:
   detecting the location of the terminal device;
   transmitting to an external device location information that indicates the detected location;
   receiving from the external device a return signal in response to the location information;
   prohibiting the operation of the terminal device according to the received return signal;
   inputting authentication information; and
   canceling the prohibition of the operation of the terminal device when the input authentication information matches pre-registered authentication information;
   wherein the prescribed conditions comprise a time component and an associated area component.

* * * * *